(12) United States Patent
Al Khatib

(10) Patent No.: US 7,701,864 B2
(45) Date of Patent: Apr. 20, 2010

(54) METHOD AND SYSTEM FOR QUANTIFYING THE PERFORMANCE OF NETWORK COMPONENT

(76) Inventor: Iyad Al Khatib, Bergengatan 23, Kista (SE) S-164 37

( * ) Notice: Subject to any disclaimer, the term of this patent is extended or adjusted under 35 U.S.C. 154(b) by 796 days.

(21) Appl. No.: 10/574,249

(22) PCT Filed: Sep. 30, 2004

(86) PCT No.: PCT/SE2004/001397

§ 371 (c)(1),
(2), (4) Date: Dec. 14, 2006

(87) PCT Pub. No.: WO2005/032048

PCT Pub. Date: Apr. 7, 2005

(65) Prior Publication Data

US 2007/0076619 A1    Apr. 5, 2007

(30) Foreign Application Priority Data

Oct. 2, 2003    (SE)    ..................... 0302609

(51) Int. Cl.
H04L 12/26    (2006.01)
(52) U.S. Cl. ........................ 370/252; 370/241
(58) Field of Classification Search ............. 370/241, 370/252, 253, 229, 230, 232–234, 412–417, 370/428–429; 709/230, 232, 233
See application file for complete search history.

(56) References Cited

U.S. PATENT DOCUMENTS 5,408,465 A * 4/1995 Gusella et al. .............. 370/231

2002/0024974 A1 * 2/2002 Karagiannis et al. ........ 370/516

FOREIGN PATENT DOCUMENTS

EP    0 849 911 A2    8/1997
WO    WO 02/51181 A1    6/2002

OTHER PUBLICATIONS

Khatib, I. et al, Performance Analysis of Wireless LAN, http://web.it.kth.se/~ikhatib/lic/final/iyad_lic_final.pdf (last modified May 16, 2003, last visited Mar. 19, 2009, see attached pdf file).*
Iyad Al Khatib, MobiCom Poster: Wireless LAN Access Points as Queuing Systems: Performance Analysis and Service Time, 2002; [on-line] Retrieved on 2004; http://www.it.kth.se/~ikhatib/lic/publications/MC2R/iyad-mc2r-2page-abstract-journal.pdf.

* cited by examiner

*Primary Examiner*—William Trost, IV
*Assistant Examiner*—Charles C Jiang
(74) *Attorney, Agent, or Firm*—Jason A. Bernstein; Barnes & Thornburg LLP

(57) ABSTRACT

A method and system for quantifying the performance of a component adapted to function as a node in a communications network where the component is represented by a virtual distance (x) according to the following formula:

$$x = \frac{S_{i+1} - S_i}{IS}$$

where the virtual distance x is a representation of a metric that relates to intrinsic properties of the component.

14 Claims, 1 Drawing Sheet

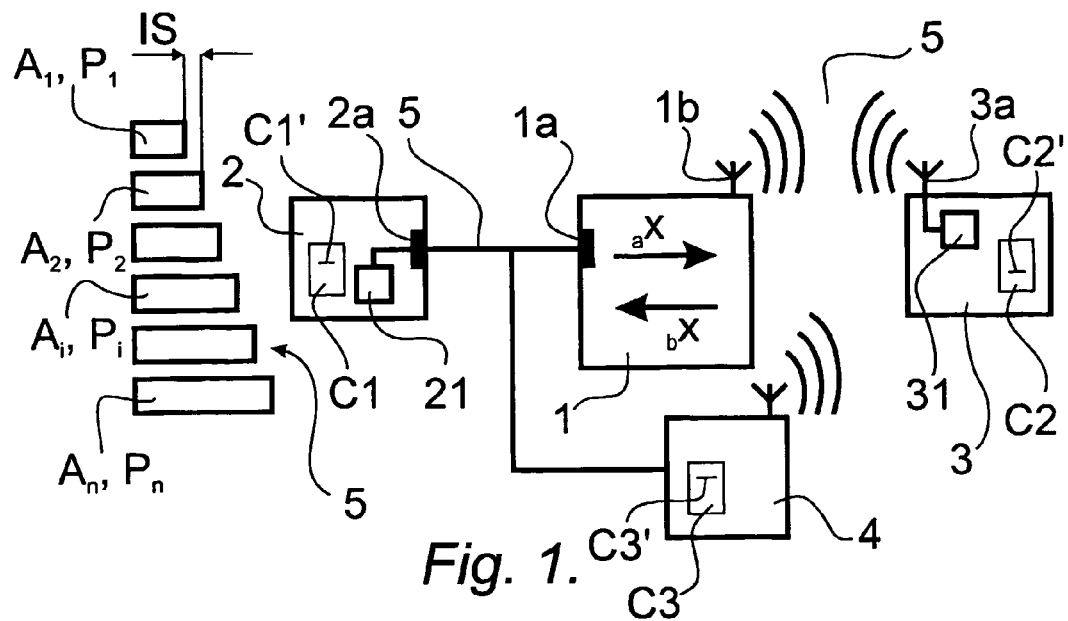
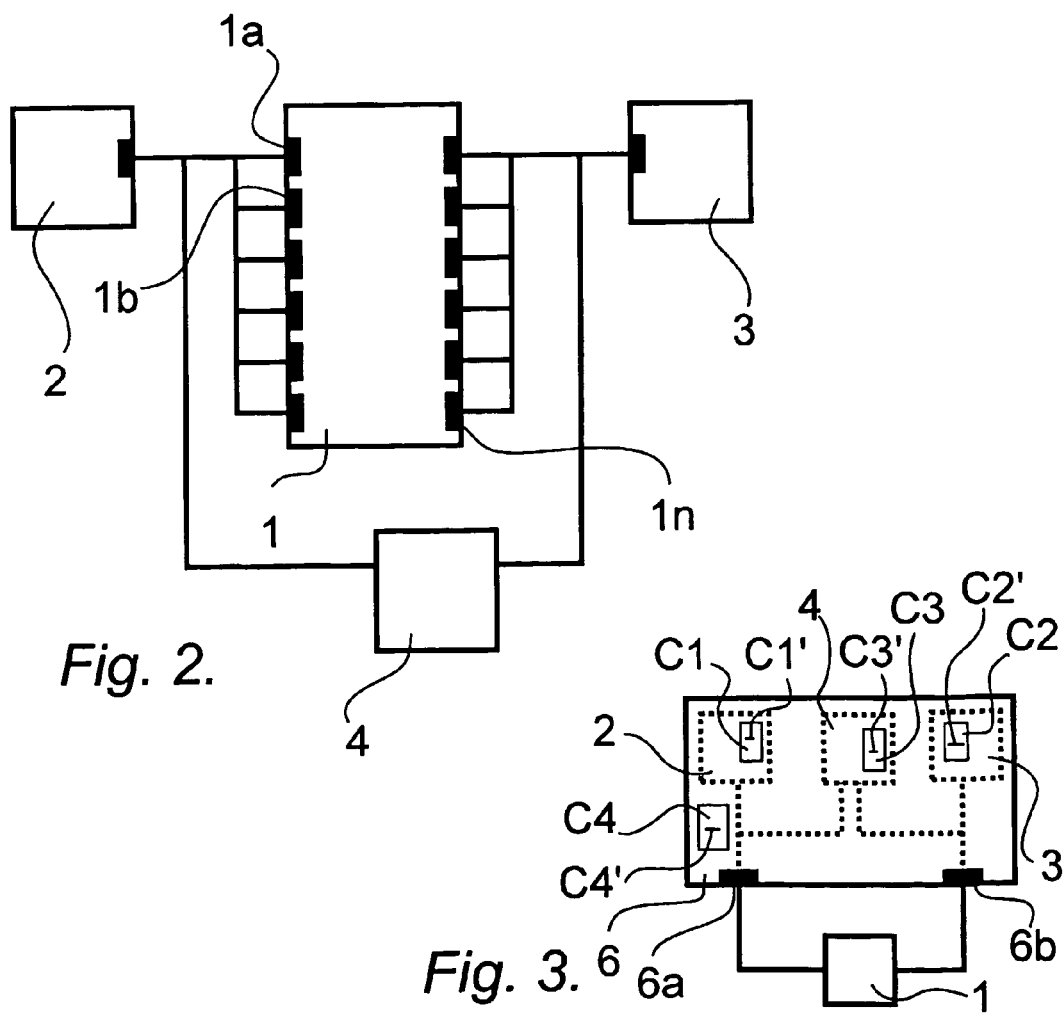

METHOD AND SYSTEM FOR QUANTIFYING THE PERFORMANCE OF NETWORK COMPONENT

PRIORITY CLAIM

This patent application is the U.S. National Phase of International Application No. PCT/SE2004/001397, having an International Filing Date of Sep. 30, 2004, which claims priority to Sweden Patent Application No. SE 0302609-3, having a Filing Date of Oct. 2, 2003, the disclosures of which are incorporated herein by reference in their entirety.

FIELD OF THE INVENTION

The present invention relates to a method and a system for quantifying the performance of a component adapted to function as a node in a communications network. The service time delay for an information unit with a certain payload is known as the time difference between the time of departure of the information unit and the time of arrival of the information unit. A first service time is known for a first information unit with a first payload, a second service time is known for a second information unit with a second payload, and so on to a last information unit with a last payload where the incremental step of payload between the first, second and following information units is predefined.

The present invention also relates to various computer program products whereby an inventive method or system can be realised.

BACKGROUND OF THE INVENTION

Network technology is spreading rapidly and the amount of systems acting as nodes in a communications network are increasing. The users of these nodes are changing from skilled technicians to computer users in small companies or private users in their homes.

There is an increasing need to provide users with possibilities to evaluate and compare network components without advanced knowledge in network communications.

Manufacturers of components used as nodes in a communications network, such as switches, routers, servers or access points and the like, usually measure performance variables that are considered relevant and list these in data sheets. The variables measured and presented vary from manufacturer to manufacturer, and it is often very hard to compare performance of two components from different manufacturers.

Various benchmarking techniques through which certain aspects of the performance of a network component can be evaluated are known.

Patent publication WO 02 51181 A1 shows a benchmark testing a network node in a radio communication network. The testing of the node pertains to load and stress testing.

Patent publication EP 0 849 911 A2 shows a method of monitoring a communications network comprising a plurality of node equipment.

The publication "Wireless LAN Access Points as Queuing Systems: Performance Analysis and Service Time", by Al Khatib et al, published 18 Dec. 2002, shows a way to measure various parameters of an access point in a communications network.

SUMMARY OF THE INVENTION

It is a problem to provide a possibility to quantify the performance of an arbitrary component adapted to function as a node in a communications network so that it can be compared with any other component adapted to function as a node in a communications network.

It is a problem to find a metric that corresponds to such quantification and that relates to intrinsic properties of the component, i.e. that is constant with respect to time, surroundings and other variables, in other words, it is a problem to provide a simple benchmarking technique to quantify quality of communication nodes as there is a Horse Power for motors, or Million Instructions Per Second (MIPS) for microprocessors, or Standby Battery Lifetime for a mobile phone.

It is also a problem to find a metric that can be used to quantify components with different characteristics for different senses, such as uplink and downlink communication, or with many different input and/or output interfaces that can be combined in different ways, thus having different characteristics for different combinations of interfaces.

With the purpose of solving one or more of the above indicated problems, and from the standpoint of the above indicated field of invention, the present invention teaches that the component is represented by a virtual distance according to the following formula:

$$x = v_1 \cdot S_1 = v_2 \cdot S_2 = \ldots = v_i \cdot S_i = v_{i+1} \cdot S_{i+1} = \ldots = v_n \cdot S_n$$

where the virtual distance x is a constant distance for a given component.

The parameter $v_i$ corresponds to a virtual speed with which an information unit with a specific payload travels. The parameter $S_i$ corresponds to the time taken to travel the distance x with the speed $v_i$, $S_i$ being the service time for an information unit with a specific payload. The speed $v_i$ is represented by:

$$v_i = \left[ \frac{S_{i+1}}{S_i} - 1 \right] \cdot IS^{-1}$$

and the constant distance x thus is represented by:

$$x = \frac{S_{i+1} - S_i}{IS}$$

where a predefined incremental step IS is the difference of payload between the first, second and following information units. The virtual distance x is a representation of a metric that relates to intrinsic properties of the component, allowing a quantification of the component.

With the purpose of allowing a quantification of a component that is adapted to communicate in two directions, the present invention teaches that two distances represent the component. A first distance represents the component in a first sense, meaning that the information units arrive to the component through a first interface and departs from the component through a second interface, such as uplink communication. A second distance represents the component in a second sense, meaning that the information units arrive to the component through the second interface and departs from the component through the first interface, such as downlink communication.

If the component has a number of usable interfaces, then the present invention teaches that the component is represented by two distances, meaning two senses, for every possible combination of interfaces.

The present invention teaches that the service time is a part of a components total response time (R), that the response time (R) is a sum of the service time (S) and a waiting time (W), that $R_i = t_{di} - t_{ai}$. If $t_{ai} \leq t_{d(i-1)}$ then $W_i = 0$ and $S_i = R_i$, and if $t_{ai} < t_{d(i-1)}$ then $W_i = t_{d(i-1)} - t_{ai}$ and $S_i = t_{di} - t_{d(i-1)}$.

The service time comprises the time to process, to check for errors and to transmit an information unit, and the time to process an information unit may include any management time and other delays relating to network specific details.

The present invention teaches that statistical methods are used to obtain values for service times, and thus virtual speed, representing information units with different payloads, and virtual distance representing the component, with sufficient accuracy and certainty.

The advantages of a method, system, a single computing unit or any computer program product according to the present invention are that the present invention will provide a metric that relates to intrinsic properties of the component, allowing a quantification of a component that makes the component comparable with the same quantification of an entirely different kind of component.

The quantification according to the invention can be made on any component adapted to function as a node in a communications network.

The results gotten from the statistical calculations on the quality of a unit according to the present invention are repeatable; unlike the benchmarking techniques that exist on networking that differ in their results from one hour in the day to another.

BRIEF DESCRIPTION OF THE DRAWINGS

A method, a system, various computer program products and a single computing unit according to the present invention will now be described in detail with reference to the accompanying drawings, in which:

FIG. 1 is a schematic and simplified illustration of a first embodiment of a method and system according to the present invention, adapted to a component with a first and second interface for communication, FIG. 2 is a schematic and simplified illustration of a second embodiment of a method and system according to the present invention, adapted to a component with a number of different usable interfaces for communication, and FIG. 3 is a schematic and simplified illustration of an embodiment of the present invention where a single computing unit is adapted to perform the functions of both the first, second and third computing units according to previous embodiments.

DESCRIPTION OF THE INVENTION

The present invention will now be described with reference to FIG. 1 showing a component 1 adapted to function as a node in a communications network. This component 1 is connected to a first computing unit 2 and a second computing unit 3, thus forming a simulation of a network environment. The present invention relates to a method for quantifying the performance of the component 1.

The performance of the component is evaluated from a situation where a message, in the following described as an information unit, which for example could be a packet in a packet switched network, is sent from the first or second computing unit to the other of the first or second computing units through the component 1. A third computing unit 4, not being a part of the communication path, is monitoring different parameters pertaining to the communication and respective information unit.

The following parameters are definitions that are used in the inventive method or system. The service time delay S for an information unit A with a certain payload P is known as the time difference between the time of departure $t_d$ from the component 1 of the information unit A and the time of arrival $t_a$ to the component 1 of the information unit A, where a first service time $S_1$ is known for a first information unit $A_1$ with a first payload $P_1$, a second service time $S_2$ is known for a second information unit $A_2$ with a second payload $P_2$, and so on to a last information unit $A_n$ with a last payload $P_n$.

A stream of information units 5, in the figure schematically illustrated with blocks of different sizes, are sent with a predefined incremental step IS of payload between the first, second and following information units $A_1, A_2, \ldots, A_i, \ldots, A_n$ in the stream of information.

The present invention specifically teaches that the component is represented by a virtual distance x according to the following formula:

$$x = v_1 \cdot S_1 = v_2 \cdot S_2 = \ldots = v_i \cdot S_i = v_{i+1} \cdot S_{i+1} = \ldots = v_n \cdot S_n$$

where the virtual distance x is a constant distance for a given component, where $v_i$ corresponds to a virtual speed with which an information unit Ai with a specific payload $P_i$ travels, and $S_i$ corresponds to the time taken to travel the distance x with the speed $v_i$, $S_i$ being the service time for an information unit $A_i$ with payload $P_i$.

The virtual speed v is a function of the payload P, very much in the same way as the speed of a real vehicle is a function of its load where the speed decreases as the load increases. The following model of this dependency is set up in order to arrive at a dependency between speed and payload:

$$v_i = \frac{1}{P_i + \beta}$$

where $$\beta = \frac{IS}{m-1} - P_i \text{ and } m = \frac{S_{i+1}}{S_i}$$

This gives us that the speed $v_i$ is represented by:

$$v_i = \frac{1}{P_i + \left[\frac{IS}{m-1} - P_i\right]} = \frac{m-1}{IS} = \frac{\frac{S_{i+1}}{S_i} - 1}{IS} = \left[\frac{S_{i+1}}{S_i} - 1\right] \cdot IS^{-1}$$

The virtual distance x is thus represented by:

$$x = \frac{S_{i+1} - S_i}{IS}$$

This gives us that the virtual distance x is a representation of a constant metric that relates to intrinsic properties of the component, allowing a quantification of the component whereby the component can be compared with any other component quantified in the same way.

FIG. 1 shows that the component 1 communicates through two different interfaces, a first interface 1a, in the figure exemplified with an interface for wire bound communication, and a second interface 1b, in the figure exemplified with an interface for wireless communication.

The present invention teaches that such a component is represented by two distances, where a first distance $_a$x represents the component in a first sense, meaning that as the information units arrive to the component 1 through the first interface 1a and departs from the component 1 through the second interface 1b, such as uplink communication. A second distance $_b$x represents the component 1 in a second sense, meaning that the information units arrive to the component 1 through the second interface 1b and departs from the component 1 through the first interface 1a, such as downlink communication.

FIG. 2 shows a component 1 with a number of usable interfaces 1a, 1b, ..., 1n, for communication. The present invention teaches that two distances, meaning two senses, for every possible combination of interfaces for input and output communication, represent such a component.

Service time can be defined in different ways and quantification according to the present invention should give a result that is not dependent on other network characteristics then the actual characteristics of the component.

The service time S according to the present invention is thus a part of a component's total response time R, where the response time R is a sum of the service time S and a waiting time W. The response time is thus defined as $R_i = t_{di} - t_{ai}$.

If $t_{ai} \geq t_{d(i-1)}$ then $W_i = 0$ and $S_i = R_i$, and if $t_{ai} < t_{d(i-1)}$ then $W_i = t_{d(i-1)} - t_{ai}$ and $S_i = t_{di} - t_{d(i-1)}$.

The present invention teaches that the service time S comprises the time to process, to check for errors and to transmit an information unit A, and that the time to process an information unit A may include any management time and other delays relating to network specific details.

Since a method or system according to the invention is to be used for non-ideal components it is proposed that statistical methods are used to obtain values for service times S, and thus virtual speed v, representing information units A with different payloads P, and virtual distance x representing the component 1, with sufficient accuracy and certainty.

The present invention also relates to a system for quantifying the performance of a component 1 adapted to function as a node in a communications network. With renewed reference to FIG. 1, the system comprises a first, second and third computing unit, where the first computing unit 2 is connected to the component 1 by means of a first interface 1a, and where the second computing unit 3 is connected to the component 1 by means of a second interface 1b. Both the first and second computing units 2, 3 comprises means for communication 21, 31 and interfaces for communication 2a, 3a according to different standard of communication in a network environment.

The first computing unit 2 is adapted to send an information unit A with a certain payload P to the second computing unit 3 through the component 1.

The third computing unit 4 is adapted to use the information obtained by calculating the service time delay S for the information unit A by measuring the time difference between the time of departure $t_d$ of the information unit A from the component 1 and the time of arrival $t_a$ of the information unit A to the component 1.

The first computing unit 2 is adapted to send a stream of information units 5 to the second computing unit 3 through the component 1, where the incremental step IS of payload between a first, second and following information units $A_1$, $A_2$, ..., $A_i$, ..., $A_n$ is predefined.

The third computing unit 4 is adapted to measure a first service time $S_1$ for a first information unit $A_1$ with a first payload $P_1$, a second service time $S_2$ for a second information unit $A_2$ with a second payload $P_2$, and so on to a last information unit $A_n$ with a last payload $P_n$ in the stream of information units.

The present invention teaches that the component 1 is represented by a virtual distance x, and that the third computing unit 4 is adapted to calculate the virtual distance according to the following formula:

$$x = v_1 \cdot S_1 = v_2 \cdot S_2 = \ldots = v_i \cdot S_i = v_{i-30\ 1} \cdot S_{i+1} = \ldots = v_n \cdot S_n$$

where the virtual distance x is a constant distance for a given component 1.

The parameter $v_i$ corresponds to a virtual speed with which an information unit $A_i$ with a specific payload $P_i$ travels, and $S_i$ corresponds to the time taken to travel the distance x with the speed $v_i$, $S_i$ being the service time for an information unit $A_i$ with payload $P_i$, that the speed $v_i$ is represented by:

$$v_i = \left[\frac{S_{i+1}}{S_i} - 1\right] \cdot IS^{-1}$$

and the constant distance x thus is represented by:

$$x = \frac{S_{i+1} - S_i}{IS}$$

The third computing unit 4 is adapted to present the virtual distance x as a representation of a metric that relates to intrinsic properties of the component 1, thus providing the quantification of the component 1.

According to one preferred embodiment is the third computing unit 4 adapted to calculate two distances representing the component 1. A first distance $_a$x represents the component 1 in a first sense, where the first computing unit 2 is, adapted to send information units to the second computing unit 3 through the component 1, the first computing unit 2 thus being adapted to act as a sending computing unit and the second computing unit 3 thus being adapted to act as a receiving computing unit, such as uplink communication, and where a second distance $_b$x represents the component 1 in a second sense, where the second computing 3 unit is adapted to send packets to the first computing 2 unit through the component 1, the second computing unit 3 thus being adapted to act as a sending computing unit and the first computing unit 2 thus being adapted to act as a receiving computing unit, such as downlink communication.

FIG. 2 shows an embodiment where the component 1 has a number of usable interfaces 1a, 1b, 1n. The present invention teaches that in this case, the first and second computing units 2, 3 are adapted to communicate with each other through the component 1 through every possible combination of interfaces, and that the third computing unit 4 is adapted to calculate and present two distances representing the component 1, meaning two senses, for every possible combination of interfaces.

The third computing unit 4 is adapted to extract the service time S from the total response time of the component. The response time R is a sum of the service time S and a waiting time W of the component, where $R_i = t_{di} - t_{ai}$.

If $t_{ai} \geq t_{d(i-1)}$ then $W_i = 0$ and $S_i = R_i$, and that if $t_{ai} < t_{d(i-1)}$ then $W_i = t_{d(i-1)} - t_{ai}$ and $S_i = t_{di} - t_{d(i-1)}$.

It is also proposed that the service time S comprises the time to process, to check for errors and to transmit an information unit A, and that the time to process an information unit A may include any management time and other delays relating to network specific details.

The present invention teaches that the first and second computing units 2, 3 are adapted to send and receive several streams of information units through the component 1, each stream being sufficiently long to represent information units A with different payloads P, in order to provide the third computing unit 4 with measurement data required to perform statistical methods to obtain values for service times S, virtual speed v and virtual distance x with sufficient accuracy and certainty.

The present invention also relates to a number of computer program products, schematically illustrated in FIG. 1.

A first computer program product C1 comprises first computer program code C1', which, when executed by a computing unit, makes the computing unit work as an inventive first computing unit 2.

A second computer program product C2 comprises second computer program code C2', which, when executed by a computing unit, makes the computing unit work as an inventive second computing unit 3.

A third computer program product C3 comprises third computer program code C3', which, when executed by a computing unit, makes the computing unit work as an inventive third computing unit 4.

A fourth computer program product C4, shown in FIG. 3, comprises fourth computer program code C4', which, when executed by a computing unit, makes the computing unit perform the above described inventive method.

FIG. 3 shows schematically an embodiment with a single computing unit 6, a Quantifying Performance Unit, QPU, for quantifying the performance of a component 1 adapted to function as a node in a communications network.

The single computing 6 unit is adapted to function as both an inventive first, second and third computing unit 2, 3, 4, these units shown in dotted lines in the figure, where the single unit 6 comprises required interfaces 6a, 6b and means for communication to perform the functions of the inventive first, second and third computing units 2, 3, 4.

According to one embodiment, the single computing unit 6 comprises computer program code C4' according to the inventive fourth computer program product C4.

It is also possible to let the single computing 6 unit comprise computer program code C1', C2', C3' according to the inventive first, second and third computer program product C1, C2, C3.

It will be understood that the invention is not restricted to the aforedescribed and illustrated exemplifying embodiments thereof and that modifications can be made within the scope of the inventive concept as illustrated in the accompanying claim.

The invention claimed is:

1. A method for quantifying the performance of a component configured to function as a node in a communications network, the method comprising:
   sending an information unit (A) with a certain payload (P) by at least one computing unit through the component; and
   calculating a service time delay (S) for the information unit (A) by the at least one computing unit, wherein the service time delay (S) for the information unit (A) with the certain payload (P) is known as the time difference between a time of departure ($t_d$) of said information unit (A) and a time of arrival ($t_a$) of said information unit (A), where a first service time ($S_1$) is known for a first information unit ($A_1$) with a first payload ($P_1$), a second service time ($S_2$) is known for a second information unit ($A_2$) with a second payload ($P_2$), and so on to a last information unit ($A_n$) with a last payload ($P_n$) in a stream of payloads, and where an incremental step (IS) of payload between said first, second and following information units ($A_1, A_2, \ldots, A_n$) is predefined, wherein said component is represented by a virtual distance (x) according to the following formula:

$$x = v_1 \cdot S_1 = v_2 \cdot S_2 = \ldots = v_i \cdot S_i = v_{i+1} \cdot S_{i+1} = \ldots = v_n \cdot S_n$$

wherein the virtual distance x is a constant distance for a given component, that $v_i$ corresponds to a virtual speed with which an information unit ($A_i$) with a specific payload $P_i$ travels;

wherein $S_i$ corresponds to the time taken to travel said distance x with the speed $v_i$, $S_i$ being the service time for an information unit $A_i$ with payload $P_i$;

wherein the speed $v_i$ is represented by:

$$v_i = \left[\frac{S_{i+1}}{S_i} - 1\right] \cdot IS^{-1}$$

wherein the constant distance x thus is represented by:

$$x = \frac{S_{i+1} - S_i}{IS}, \text{ and },$$

wherein the virtual distance x is a representation of a metric that relates to intrinsic properties of said component, allowing said quantification of said component.

2. The method according to claim 1, wherein said component is represented by two distances:
   a first distance $_a x$ representing said component in a first sense, meaning that as said information units arrive to said component through a first interface and depart from said component through a second interface; and
   a second distance $_b x$ representing said component in a second sense, meaning that said information units arrive to said component through said second interface and depart from said component through said first interface.

3. The method according to claim 1, wherein if said component has a number of usable interfaces then said component is represented by two distances, meaning two senses, for every possible combination of interfaces.

4. The method according to claim 1, wherein said service time delay (S) is a part of the component's total response time (R), and wherein the response time delays (R) is a sum of said service time (S) and a waiting time (W), whereby $R_i = t_{di} - t_{ai}$, whereby if $t_{ai} \geq t_{d(i-1)}$ then $W_i = 0$ and $S_i = R_i$, and whereby if $t_{ai} < t_{d(i-1)}$ then $W_i = t_{d(i-1)} - t_{ai}$ and $S_i = t_{di} - t_{d(i-1)}$.

5. The method according to claim 1, wherein service time delay (S) comprises the time to process, to check for errors and to transmit an information unit (A), and wherein the time to process an information unit includes management time and other delays relating to network specific details.

6. The method according to claim 1, wherein statistical methods are used to obtain values for service time delay (S), and thus virtual speed (v), representing information units (A) with different payloads (P), and virtual distance (x) representing said component.

7. A system for quantifying the performance of a component adapted to function as a node in a communications network, said system comprising:
   a first computing unit connected to said component by means of a first interface (1a);

a second computing unit connected to said component by means of a second interface;

where said first computing unit adapted to send an information unit (A) with a certain payload (P) to said second computing unit through said component;

a third computing unit adapted to passively calculate the service time delay (S) for said information unit (A) by using the information obtained by measuring the time difference between the time of departure ($t_d$) of said information unit (A) from said component and the time of arrival ($t_a$) of said information unit (A) to said component;

said first computing unit adapted to send a stream of information units where the incremental step (IS) of payload between a first, second and following information units ($A_1, A_2, \ldots, A_n$) is predefined;

said third computing unit adapted to measure a first service time delay ($S_1$) for a first information unit ($A_1$) with a first payload ($P_1$), a second service time delay ($S_2$) for a second information unit ($A_2$) with a second payload ($P_2$), and so on to a last information unit ($A_n$) with a last payload ($P_a$) in said stream of information units, wherein said component is represented by a virtual distance x, said third computing unit adapted to calculate said virtual distance according to the following formula:

$$x = v_1 \cdot S_1 = v_2 \cdot S_2 = \ldots = v_i \cdot S_i = v_{i+1} \cdot S_{i+1} = \ldots = v_n \cdot S_n;$$

said virtual distance x is a constant distance for a given component, that $v_1$ corresponds to a virtual speed with which an information unit ($A_i$) with a specific payload ($P_1$) travels, that $S_i$ corresponds to the time taken to travel said distance x with the speed $v_i$, $S_i$ being the service time for an information unit $A_i$ with payload $P_i$; the speed $v_i$ is represented by:

$$v_i = \left[ \frac{S_{i+1}}{S_i} - 1 \right] \cdot IS^{-1}$$

the constant distance x thus is represented by:

$$x = \frac{S_{i+1} - S_i}{IS}, \text{ and}$$

said third computing unit adapted to present the virtual distance x as a representation of a metric that relates to intrinsic properties of said component, thus providing said quantification of said component.

8. The system according to claim 7, wherein said third computing unit is adapted to calculate two distances representing said component:

a first distance $_ax$ represents said component in a first sense, where said first computing unit is adapted to send information units to said second computing unit through said component, such as uplink communication; and a second distance $_bx$ represents said component in a second sense, where said second computing unit is adapted to send packets to said first computing unit through said component.

9. The system according to claim 7 wherein if said component has a number of usable interfaces, then said first and second computing units are adapted to communicate with each other through said component through every possible combination of interfaces, and wherein said third computing unit is adapted to calculate and present two distances representing said component, meaning two senses, for every possible combination of interfaces.

10. The system according to claim 7, wherein said third computing unit is adapted to extract said service time delay (S) from the total response time of said component, where the response time (R) is a sum of said service time delay (S) and a waiting time (W) of said component, wherein:

$R_i = t_{di} - t_{ai}$, that if $t_{ai} \geq t_{d(i-1)}$ then $W_i = 0$ and $S_i = R_i$, and that if $[-]t_{ai} < t_{d(i-1)}$ then $W_i = t_{d(i-1)} - t_{ai}$ and $S_i = t_{di} - t_{d(i-1)}$.

11. The system according to claim 7, wherein said service time delay (S) comprises the time to process, to check for errors and to transmit an information unit (A), and wherein the time to process an information unit (A) may include any management time and other delays relating to network specific details.

12. The system according to claim 7, wherein said first and second computing units are adapted to send and receive a plurality of streams of information units through said component, each stream being sufficiently long to represent information units (A) with different payloads (P), in order to provide said third computing unit with measurement data required to perform statistical methods to obtain values for service time delays, virtual speed and virtual distance.

13. A single computing unit for quantifying the performance of a component adapted to function as a node in a communications network, wherein the single computing unit is adapted to function as a first, second and third computing unit, said single computing unit comprising:

a first computing unit connected to said component by means of a first interface (1a);

a second computing unit connected to said component by means of a second interface;

where said first computing unit adapted to send an information unit (A) with a certain payload (P) to said second computing unit through said component;

a third computing unit being adapted to passively calculate the service time delay (S) for said information unit (A) by using the information obtained by measuring the time difference between the time of departure ($t_d$) of said information unit (A) from said component and the time of arrival ($t_a$) of said information unit (A) to said component;

wherein said first computing unit is adapted to send a stream of information units where an incremental step (IS) of payload between a first, second and following information units ($A_1, A_2, \ldots, A_n$) is predefined;

wherein said third computing unit is adapted to measure a first service time delay ($S_1$) for a first information unit ($A_1$) with a first payload ($P_1$), a second service time delay ($S_2$) for a second information unit ($A_2$) with a second payload ($P_2$), and so on to a last information unit ($A_n$) with a last payload ($P_n$) in said stream of information units, wherein said component is represented by a virtual distance x, said third computing unit being adapted to calculate said virtual distance according to the following formula:

$$x = v_1 \cdot S_1 = v_2 \cdot S_2 = \ldots = v_i \cdot S_i = v_{i+1} \cdot S_{i+1} = \ldots = v_n \cdot S_n;$$

said virtual distance x is a constant distance for a given component, wherein $v_i$ corresponds to a virtual speed with which an information unit ($A_i$) with a specific payload ($P_i$) travels, that $S_i$ corresponds to the time taken to travel said distance x with the speed $v_i$, $S_i$ being the service time for an information unit $A_i$ with payload $P_i$;
wherein the speed $v_i$ is represented by:

$$v_i = \left[\frac{S_{i+1}}{S_i} - 1\right] \cdot IS^{-1}$$

the constant distance x is represented by:

$$x = \frac{S_{i+1} - S_i}{IS}, \text{ and}$$

wherein said third computing unit is adapted to present the virtual distance x as a representation of a metric that relates to intrinsic properties of said component, thus providing said quantification of said component.

14. The single computing unit according to claim 13, wherein said single computing unit comprises computer program code, which, when executed by a computing unit, makes said computing unit perform a method comprising the steps of:
  sending an information unit (A) with a certain payload (P) by the computing unit through a component adapted to function as a node in a communications network; and
  calculating a service time delay (S) for the information unit (A) by the computing unit,
  wherein the service time delay (S) for the information unit (A) with the certain payload (P) is known as the time difference between a time of departure ($t_d$) of said information unit (A) and a time of arrival ($t_a$) of said information unit (A), where a first service time delay ($S_1$) is known for a first information unit ($A_1$) with a first payload ($P_1$), a second service time delay ($S_2$) is known for a second information unit ($A_2$) with a second payload ($P_2$), and so on to a last information unit ($A_n$) with a last payload ($P_n$) in a stream of payloads, and wherein an incremental step (IS) of payload between said first, second and following information units ($A_1, A_2, \ldots, A_n$) is predefined, wherein said component is represented by a virtual distance (x) according to the following formula:

$$x = v_1 \cdot S_1 = v_2 \cdot S_2 = \ldots = v_i \cdot S_i = v_{i+1} \cdot S_{i+1} = \ldots = v_n \cdot S_n$$

wherein the virtual distance x is a constant distance for a given component,
wherein $v_i$ corresponds to a virtual speed with which an information unit (Ai) with a specific payload $P_i$ travels;
wherein $S_1$ corresponds to a time taken to travel said distance x with the speed $v_i$, $S_i$ being the service time for an information unit $A_i$ with payload $P_i$;
wherein the speed $v_i$ is represented by:

$$v_i = \left[\frac{S_{i+1}}{S_i} - 1\right] \cdot IS^{-1}$$

wherein the constant distance x thus is represented by:

$$x = \frac{S_{i+1} - S_i}{IS}, \text{ and}$$

and wherein the virtual distance x is a representation of a metric that relates to intrinsic properties of said component, allowing said quantification of said component.

* * * * *